US009068842B2

(12) United States Patent
Youssef et al.

(10) Patent No.: US 9,068,842 B2
(45) Date of Patent: Jun. 30, 2015

(54) DEVICE AND METHOD FOR DETERMINING A CHARACTERISTIC OF A PATH FORMED BY CONSECUTIVE POSITIONS OF A TRIAXIAL ACCELEROMETER RIGIDLY CONNECTED TO A MOBILE ELEMENT

(75) Inventors: Joe Youssef, Grenoble (FR); Christelle Godin, Brignoud (FR); Benoît Denis, Grenoble (FR)

(73) Assignees: COMMISSARIAT A L'ENERGIE ATOMIQUE ET AUX ENERGIES ALTERNATIVES, Paris (FR); MOVEA, Grenoble (FR)

( * ) Notice: Subject to any disclaimer, the term of this patent is extended or adjusted under 35 U.S.C. 154(b) by 515 days.

(21) Appl. No.: 13/125,145

(22) PCT Filed: Oct. 20, 2009

(86) PCT No.: PCT/EP2009/063741
§ 371 (c)(1),
(2), (4) Date: Jul. 18, 2011

(87) PCT Pub. No.: WO2010/046364
PCT Pub. Date: Apr. 29, 2010

(65) Prior Publication Data
US 2011/0264400 A1    Oct. 27, 2011

(30) Foreign Application Priority Data
Oct. 22, 2008 (FR) ..................... 08 57181

(51) Int. Cl.
*G06F 15/00* (2006.01)
*G01P 15/18* (2013.01)
(Continued)

(52) U.S. Cl.
CPC ............ *G01C 22/006* (2013.01); *G01C 21/165* (2013.01)

(58) Field of Classification Search
CPC ......... G06F 15/00; G01P 15/18; G01P 15/00; G01C 22/006; G01C 21/165; G01C 22/00; A61B 5/11; A61B 5/1038; A61B 5/1112; A61B 5/112; A61B 2503/10; A61B 5/6829
USPC ......... 702/141, 160, 161; 73/510, 865.4, 490, 73/492, 489
See application file for complete search history.

(56) References Cited

U.S. PATENT DOCUMENTS 8,221,290 B2 *   7/2012   Vincent et al. .................... 482/8

OTHER PUBLICATIONS

R. Stirling, et al., "An innovative shoe-mounted pedestrian navigation system", GNSS 2003.*

(Continued)

*Primary Examiner* — Mohamed Charioui
*Assistant Examiner* — Ruihua Zhang
(74) *Attorney, Agent, or Firm* — Stroock & Stroock & Lavan LLP

(57) ABSTRACT

Device for determining a characteristic of a trajectory formed of successive positions of a triaxial accelerometer (3A) rigidly tied to a mobile element (EM), between a first instant of immobility ($t_0$) and a second instant of immobility ($t_n$) of the triaxial accelerometer (3A), subsequent to said first instant of immobility ($t_0$), said device comprising, furthermore, a triaxial additional sensor for measuring a vector of a substantially constant vector field between said first and second instants of immobility ($t_0, t_n$), in a fixed global reference frame (GE) tied to the terrestrial reference frame, said additional sensor being rigidly tied to said mobile element (EM) and fixed in the reference frame of the accelerometer (3A), and control means (CMD).

25 Claims, 2 Drawing Sheets

(51) Int. Cl.
*G01C 22/00* (2006.01)
*G01C 21/16* (2006.01)

(56) References Cited

OTHER PUBLICATIONS

R. Stirling, "Development of a pedestrian navigation system using shoe mounted sensors", M.S. thesis, University of Alberta, 2004.*
S. Bamberg, et al., "Gait analysis using a shoe-integrated wireless sensor system", IEEE, Jul. 2008.*
Written Opinion of the International Search Authority. PCT/EP2009/063741. Feb. 23, 2010.
Stirling, Ross et al. An Innovative Shoe-Mounted Pedestrian Navigation System. GNSS 2003, 2003 XP002540353.
Alvarez, Juan C. et al. Multisensor Approach to Walking Distance Estimation with Foot Inertial Sensing. Engineering in Medicine and Biology Society. EMBS 2007, 29th Annual Conference of the IEEE. Aug. 2007. pp. 5719-5722.

* cited by examiner

DEVICE AND METHOD FOR DETERMINING A CHARACTERISTIC OF A PATH FORMED BY CONSECUTIVE POSITIONS OF A TRIAXIAL ACCELEROMETER RIGIDLY CONNECTED TO A MOBILE ELEMENT

This application is a national phase application under §371 of PCT/EP2009/063741, filed Oct. 20, 2009, which claims priority to French Patent Application No. 0857181, filed Oct. 22, 2008, the entire content of which is expressly incorporated herein by reference.

FIELD OF THE INVENTION

The invention pertains to a device for determining a characteristic of a trajectory formed of successive positions of a triaxial accelerometer tied to a mobile element.

BACKGROUND OF THE INVENTION

In a general manner, the invention is related to the fields of motion capture, and the geolocating of individuals moving around. Motion capture relates to general-public applications such as leisure applications (interactive games consoles, tracking of sports movements, virtual reality or augmented reality), applications for aiding the navigation of pedestrians (the most widely used at the present time being satellite navigation systems such as GPS), applications for aiding the mobility of vulnerable persons or those temporarily enfeebled by their environment (handicapped persons or those plunged into darkness), and fitness applications (pedometer, calculation of energy expenditure or of distance traveled). Motion capture also relates to medical applications (tracking of the elderly and/or of dependents, analysis of the gait for postural reeducation or aid to diagnosis), safety or rescue applications (locating of firemen inside a building on fire, operational tracking of military servicemen, or surveillance of prisoners), as well as commercially directed applications (statistics on the trajectories followed by consumers in shopping centers or supermarkets, definition of archetypes of use, or proposal of topo-dependent commercial services).

It is notably known to reconstruct the movement of an object or of a person fitted with an object comprising an emitter of signals that are recognized by a satellite-based navigation aid system, such as the GPS system, outdoors, and by a radiolocation system based on Ultra Wide Band (UWB) or WiFi transmissions indoors.

In numerous geographical zones, external or internal, navigation relying on a satellite-based navigation aid or radiolocation system turns out nonetheless to be very tricky, because of the obstruction of the radio signals that are required for the measurement of topo-dependent metrics, for example in the case of unavailability of the signals emitted by one or more satellites of the navigation aid system and required for the measurement of pseudo-distances. In practice, these blockage or obstruction situations heavily degrade the accuracy of the location information, and sometimes even render the navigation aid service unavailable, as illustrated in the document "An evaluation of UWB localization under non line-of-sight (NLOS) propagation" (A. Maali, A. Ouldali, H. Mimoun, and G. Baudoin), published in Wireless Pervasive Computing, ISWPC, 3rd International Symposium on, pages 379-382, in May 2008. Generally, the implementations cited above exhibit a cost, consumption, bulkiness, and/or infrastructure that are unsuitable or indeed crippling for general-public applications.

Other systems are aimed at computing a path on the basis of a given departure point, by using attitude sensors (accelerometer(s), magnetometer(s), gyrometer) usually delivering inertial measurements. These measurements make it possible to undertake navigation by more or less accurate and complicated means, such as described, for example in the documents "Inertial head-tracker sensor fusion by a complementary separate-bias kalman filter" (E. Foxlin) published in March 1996 in Virtual Reality Annual International Symposium, Proceedings of the IEEE 1996, pages 185-194; "Detection of spatio-temporal gait parameters by using wearable motion sensors" (K. Kogure L. Seon-Woo, and K. Mase), published in 2005 in Engineering in Medicine and Biology Society. IEEE-EMBS 2005. 27th Annual International Conference of the, pages 6836-6839, 2005; "Pedestrian tracking with shoe-mounted inertial sensors" (E. Foxlin), published in November 2005 in Computer Graphics and Applications, IEEE, 25:38-46, November-December 2005; or "Integration of foot-mounted inertial sensors into a Bayesian location estimation framework" (P. Robertson B. Krach), published in March 2008 in Positioning, Navigation and Communication, 2008. WPNC 2008. 5th Workshop on, pages 55-61. Such systems are of high cost and complexity, and often lack accuracy.

Video games consoles, such as the Wii, use optical and/or ultrasound sensors to determine the trajectory of a game control element. These systems are expensive and limited.

There also exist, as presented in the documents "Assessment of walking features from foot inertial sensing" (S. Scapellato F. Cavallo A. M. Sabatini, and C. Martelloni), published in March 2005 in Biomedical Engineering, IEEE Transactions on, pages 486-494, or "Multisensor approach to walking distance estimation with foot inertial sensing" (D. Alvarez A. M Lopez J. Rodriguez-Uria J. C. Alvarez, and R. C. Gonzalez), published in August 2007 in Engineering in Medicine and Biology Society, 2007, EMBS 2007. 29th Annual International Conference of the IEEE, pages 5719-5722, systems which assume two accelerometers and a gyrometer which are disposed in the sagittal plane of a user, making it possible to determine the attitude of this sensor in the plane. The acceleration is integrated on the axis of the foot. These systems have a reduced cost, but present other drawbacks. On the one hand, they assume that the sensors are perfectly placed in the sagittal plane, this being almost impossible for the user to actually achieve, and causing an estimation error related to the poor positioning of the sensor or sensors. On the other hand, they assume that walking takes place in the sagittal plane, which may not be the case, when walking sideways on, for example.

The document, "An innovative shoe-mounted pedestrian navigation system" (K. Fyfe, Gérard Lachapelle, R. Stirling, and J. Collin), published in April 2003 in Proc. European Navigation Conf. (GNSS), CD-ROM, Austrian Inst. of Navigation, discloses a system fitted with three accelerometers and with a fourth accelerometer so as to calculate the angle undergone by the sensor. This further accelerometer is placed on the same mobile element, but some distance from the latter. The two sensors therefore see the same rotation and the same displacement. Such a structure makes it possible to estimate the speed of rotation of the mobile element, in rotation about a substantially constant direction, while dispensing with a gyrometer. This system has a reduced cost due to the replacing of a single-axis gyrometer with a pair of accelerometers with respect to the systems with gyrometers proposed by Alvarez et al. and Scapellato et al. However, such a system exhibits the same drawbacks as the example cited hereinabove, since only the rotation about the axis orthogonal to the sagittal plane is taken into account. Furthermore, the estimation of the rotation by a pair of accelerometers, just like that carried out with the aid of a gyrometer, exhibits significant drifts. A heading is also determined with the aid of a magnetometer, for example when the foot is resting, thus giving the direction of the foot and not the sought-after direction of the displacement.

SUMMARY OF THE INVENTION

The aim of the invention is to determine a trajectory at reduced cost, and to solve the problems cited above.

According to one aspect of the invention, there is proposed a device for determining a characteristic of a trajectory formed of successive positions of a triaxial accelerometer rigidly tied to a mobile element, between a first instant of immobility and a second instant of immobility of the triaxial accelerometer, subsequent to said first instant of immobility, said device comprising, furthermore, a triaxial additional sensor for measuring a vector of a substantially constant vector field between said first and second instants of immobility, in a fixed global reference frame tied to the terrestrial reference frame, said additional sensor being rigidly tied to said mobile element and fixed in the reference frame of the accelerometer, and control means, characterized in that said control means comprise:

first means for determining said first and second instants of immobility of the triaxial accelerometer;
second means for determining a substantially invariant axis of rotation of the triaxial accelerometer between said first and second instants of immobility, and a plane orthogonal to said substantially invariant axis of rotation, in a mobile reference frame tied to the accelerometer or to the additional sensor on the basis of the vectors delivered by the triaxial accelerometer, or on the basis of the vectors delivered by the additional sensor;
first means for calculating, at said successive instants, first orthogonal projections onto said plane of the vectors delivered by the triaxial accelerometer and of the vectors delivered by the additional sensor in said mobile reference frame;
third means for determining, at said successive instants, the rotation for switching from said mobile reference frame to said fixed global reference frame, on the basis of said first orthogonal projections of the vectors delivered by the additional sensor;
second means for calculating, at said successive instants, second orthogonal projections in said fixed global reference frame, of the first orthogonal projections, provided by said first calculation means, in said plane of the vectors delivered by the triaxial accelerometer;
third calculation means for subtracting from each second orthogonal projection in said fixed global reference frame the mean vector over said successive instants, so as to obtain the accelerations centered in said plane, devoid of the influence of terrestrial gravity and of drifts of said device, in said fixed global reference frame; and
fourth means for calculating a characteristic of the trajectory on the basis of the centered accelerations.

Such a device makes it possible to determine a trajectory of a triaxial accelerometer tied to a mobile element, in an accurate manner and at reduced cost. The mobile element may be a part of the human body like a foot or a hand, or a part of an animal body, as well as a part of an artificial body such as a robot or a computer mouse. In the subsequent description, the invention will be described for a foot of a human body, but can be applied by analogy to any mobile element.

In one mode of implementation, said successive positions are substantially coplanar.

For example, the device may be a device for determining a trajectory formed of substantially coplanar successive positions of a triaxial accelerometer rigidly tied to a mobile element of a human, animal or artificial body, between a first instant of immobility and a second instant of immobility of the triaxial accelerometer, subsequent to said first instant of immobility, the triaxial accelerometer being in rotation with respect to a substantially constant direction between said first and second instants of immobility. Said device comprises, furthermore, an additional sensor for measuring a vector of a substantially constant vector field between said first and second instants of immobility, in a fixed global reference frame tied to the terrestrial reference frame, said additional sensor being rigidly tied to said mobile element and with measurement axes substantially parallel to the measurement axes of the accelerometer, and control means. Said control means comprise:

first means for determining said first and second instants of immobility of the triaxial accelerometer;
second means for determining the plane of said trajectory of the triaxial accelerometer, on the basis of the vectors delivered by the triaxial accelerometer, or on the basis of the vectors delivered by the additional sensor, at various successive instants between the first and the second instants of immobility, in a mobile reference frame tied to the triaxial accelerometer and to the additional sensor;
first means for calculating, at said successive instants, orthogonal projections of the vector delivered by the triaxial accelerometer and of the vector delivered by the additional sensor in said mobile reference frame, on said plane of said trajectory of the triaxial accelerometer;
third means for determining, at said successive instants, the rotation for switching from said mobile reference frame to said fixed global reference frame, on the basis of said orthogonal projections of the vectors delivered by the additional sensor;
second means for calculating, at said successive instants, the orthogonal projection in said fixed global reference frame, of the vector delivered by the triaxial accelerometer provided by said first calculation means;
third calculation means for subtracting from the vector delivered by said second calculation means at said successive instants, the mean vector over said successive instants, so as to obtain the accelerations centered in said plane of said trajectory of the triaxial accelerometer, devoid of the influence of terrestrial gravity and of drifts of said device, in said fixed global reference frame; and
fourth means for calculating the double temporal integration of said centered accelerations delivered by said third calculation means, so as to obtain the trajectory, expressed in said fixed global reference frame, of the triaxial accelerometer in said plane between said first and second instants of immobility.

Such a device makes it possible, at reduced cost, to determine a characteristic of a plane trajectory of a triaxial accelerometer tied to a mobile element, in an accurate manner.

Hence, in one mode of implementation, said mobile element is a foot, the time interval separating said first and second instants of immobility of the triaxial accelerometer corresponding to a pace of said foot.

According to one mode of implementation, said control means comprise first means for computing a direction vector, adapted for linking the respective positions, expressed in said fixed global reference frame, of the triaxial accelerometer with said first instant of immobility and with said second instant of immobility.

The direction of this vector in the fixed global reference frame gives the direction of the displacement, and its length the distance traveled.

In one mode of implementation, said plane of the trajectory being vertical, said control means comprise, furthermore, second means for computing a displacement heading with respect to said vector field measured by the additional sensor, said second computation means being adapted for performing an orthogonal projection, of said vector field measured by the additional sensor, onto a horizontal plane orthogonal to said plane of the trajectory.

If the additional sensor is a magnetometer, the direction of the displacement with respect to North is obtained. It is possible, for example, to plot the direction of the displacement on a map or to give the coordinates of this vector, thus indicating the direction in which the user has moved.

In one mode of implementation, said plane of the trajectory being vertical, said second means for determining the plane of said trajectory of the triaxial accelerometer are adapted for performing a singular-value decomposition of the three-column matrix formed by the vectors delivered by the triaxial accelerometer at said successive instants, in said mobile reference frame, and extracting the two vectors corresponding to the larger two singular values.

The device is in translation in a plane and performs a rotation about a substantially constant direction. This calculation means is robust and inexpensive in terms of the number of operations. Moreover the orientation of the sensor on the mobile element is irrelevant. No assumption is made regarding the direction of the trajectory which may be arbitrary.

In one mode of implementation, said plane of the trajectory being vertical, said second means for determining the plane of said trajectory of the triaxial accelerometer are adapted for performing a decomposition into eigenvalues and eigenvectors, in said mobile reference frame, the autocorrelation matrix of the three-column matrix formed by the vectors delivered by the triaxial accelerometer at said successive instants, and extracting the two eigenvectors corresponding to the larger two eigenvalues.

Likewise, the device is in translation in a plane and performs a rotation about a substantially constant direction. This calculation means is robust and inexpensive in terms of the number of operations. Moreover the orientation of the sensor on the mobile element is irrelevant. No assumption is made regarding the direction of the trajectory which may be arbitrary.

According to one mode of implementation, said second calculation means comprise fifth calculation means for switching to an intermediate reference frame, tied to the terrestrial reference frame, defined by a first vector delivered by said first calculation means on the basis of a vector provided by the additional sensor, and by a second vector, orthogonal to said first vector and belonging to said plane of the trajectory.

The number of calculations to be performed is thus minimized since the first vector is available and only a few multiplications and additions are used to switch to the global reference frame.

According to one mode of implementation, in which said third means for determining the rotation for switching from said mobile reference frame to said fixed global reference frame comprise means for estimating an angle, said switching rotation being defined by an orthogonal projection onto said substantially constant vector field, followed by a rotation by said estimated angle in said plane of trajectory of the triaxial accelerometer.

This estimation makes it possible to orient the trajectory in a known global reference frame, such as the NED or "North-East-Down" reference frame.

For example said estimation means are adapted for estimating said angle on the basis of the slope of the contact surface of the mobile element, and of the vector transmitted by said fifth calculation means on the basis of the vector transmitted by the triaxial accelerometer.

The slope may be known through a predetermined correspondence table providing the slope of the contact surface of the mobile element on the basis of the position of the accelerometer.

This scheme is robust once the slope is known accurately (in buildings for example the slope is often zero, another example is walking on an inclined slope of constant slope). By virtue of this scheme, in the estimated characteristic of the trajectory, the foot is on the ground at each instant of immobility For example, said estimation means are adapted for estimating said angle on the basis of a singular-value decomposition of the three-column matrix provided by said fifth calculation means on the basis of the matrix formed by the vectors delivered by the triaxial accelerometer at said successive instants.

In this case, no knowledge of the slope is required, everything is based on the statistics of the signal.

For example, said estimation means are adapted for estimating said angle as the angle, at said first or second instant of immobility, between the vector delivered by said first calculation means on the basis of the vector provided by the additional sensor, and the vector delivered by said first calculation means on the basis of the vector provided by the triaxial accelerometer.

In this case, no mapping is needed, nor any assumption regarding the trajectory, such as trajectory longer than it is high.

In one mode of implementation, said control means comprise third means for computing the distance traveled between said first and second instants of immobility, and/or during a set of successive time intervals separating two successive instants of immobility of the triaxial accelerometer, on the basis of the data provided by said fourth calculation means.

The distance traveled between the two successive instants of immobility of the triaxial accelerometer, and therefore, in the case of the foot, the distance traveled by the foot between two successive groundings, is easily calculated.

According to one mode of implementation, said control means comprise fourth means for computing a trajectory during a set of successive time intervals separating two successive instants of immobility of the triaxial accelerometer, on the basis of the data provided by said fourth calculation means.

The invention makes it possible to compute, with a number of reduced calculations, a characteristic of the trajectory of a user during a displacement.

In one mode of implementation, said additional sensor is a triaxial magnetometer for measuring the terrestrial magnetic field, substantially constant between said first and second instants of immobility.

Thus the cost is reduced, for example by comparison with the use of gyrometers.

According to one mode of implementation, said triaxial accelerometer is disposed so as to be positioned substantially at the level of the contact surface of the mobile element, at an instant of immobility of said triaxial accelerometer.

In this case, the acceleration is indeed zero during a grounding of the foot, thereby improving the accuracy of the device.

In one mode of implementation, said additional sensor is disposed so as to be positioned some distance from the contact surface of said mobile element at an instant of immobility of said triaxial accelerometer.

Disturbances in measuring the terrestrial magnetic field at ground level are avoided, thereby improving the accuracy of the device.

According to one mode of implementation, said control means are tied to the mobile element or disposed some distance from the mobile element, and adapted for operating in real or non-real time.

It is possible to produce a device in which said control means move with the mobile element or otherwise, and which processes the information in real time or otherwise.

According to another aspect of the invention, there is proposed a video game system comprising a visual or auditory indicator, such as a screen or a loudspeaker, for indicating at least one pace to be taken by the player, comprising at least one device such as described above.

It is thus possible to supervise the proper execution of the directive and, for example, to establish a score.

According to another aspect of the invention, there is proposed a jump analysis system, comprising at least one device such as described above.

It is thus possible to estimate the height, length, duration, quality of a jump.

According to another aspect of the invention, there is proposed an outdoor or indoor geolocation system, comprising at least one device such as described above.

This system is a low-cost system which may be supplemented with manual initialization (the user indicates where he is situated on a map) or with the aid of another geolocation system (GPS, UWB, etc.). In the latter case, the proposed system improves the performance of the other system or substitutes itself for it when it is no longer available (example GPS in buildings).

According to another aspect of the invention, there is proposed a system for calculating energy expenditure of a user, comprising at least one device such as described above.

This device affords significant information about the displacement of the foot. It is thus possible to integrate this information over the duration of the pace so as to obtain a fine evaluation of the energy expenditure which takes account of the height of the foot at each instant.

For example, the characteristic of the trajectory of the triaxial accelerometer comprises the velocity of the triaxial accelerometer, or the trajectory of the triaxial accelerometer.

According to another aspect of the invention, there is also proposed a method for determining a characteristic of a trajectory formed of successive positions of a triaxial accelerometer rigidly tied to a mobile element, between a first instant of immobility and a second instant of immobility of the triaxial accelerometer, subsequent to said first instant of immobility, by means furthermore of a triaxial additional sensor for measuring a vector of a substantially constant vector field between said first and second instants of immobility in a fixed global reference frame tied to the terrestrial reference frame, said additional sensor being rigidly tied to said mobile element and fixed in the reference frame of the accelerometer, said method comprising the following steps:

determining said first and second instants of immobility of the triaxial accelerometer;

determining a substantially invariant axis of rotation of the triaxial accelerometer between the first and second instants of immobility, and determining a plane orthogonal to said substantially invariant axis of rotation, in a mobile reference frame tied to the accelerometer or to the additional sensor, on the basis of the vectors delivered by the triaxial accelerometer or on the basis of the vectors delivered by the additional sensor;

calculating, at said successive instants, first orthogonal projections in said plane, of the vectors delivered by the triaxial accelerometer and of the vectors delivered by the additional sensor in said mobile reference frame;

determining, at said successive instants, the rotation for switching from said mobile reference frame to said fixed global reference frame, on the basis of said first orthogonal projections of the vectors delivered by the additional sensor;

calculating, at said successive instants, second orthogonal projections in said fixed global reference frame of the first orthogonal projections in said plane of the vectors delivered by the triaxial accelerometer;

subtracting from each second orthogonal projection in said fixed global reference frame, the mean vector over said successive instants so as to obtain the accelerations centered in said plane, devoid of the influence of terrestrial gravity and of the drifts of said device, in said fixed global reference frame; and determining a characteristic of the trajectory on the basis of the centered accelerations.

DESCRIPTION OF THE DRAWINGS

The invention will be better understood on studying a few modes of implementation described by way of wholly non-limiting examples and illustrated by the appended drawings in which.

In the set of figures, elements having the same labels are similar.

DETAILED DESCRIPTION OF A PREFERRED EMBODIMENT

Figure 1:
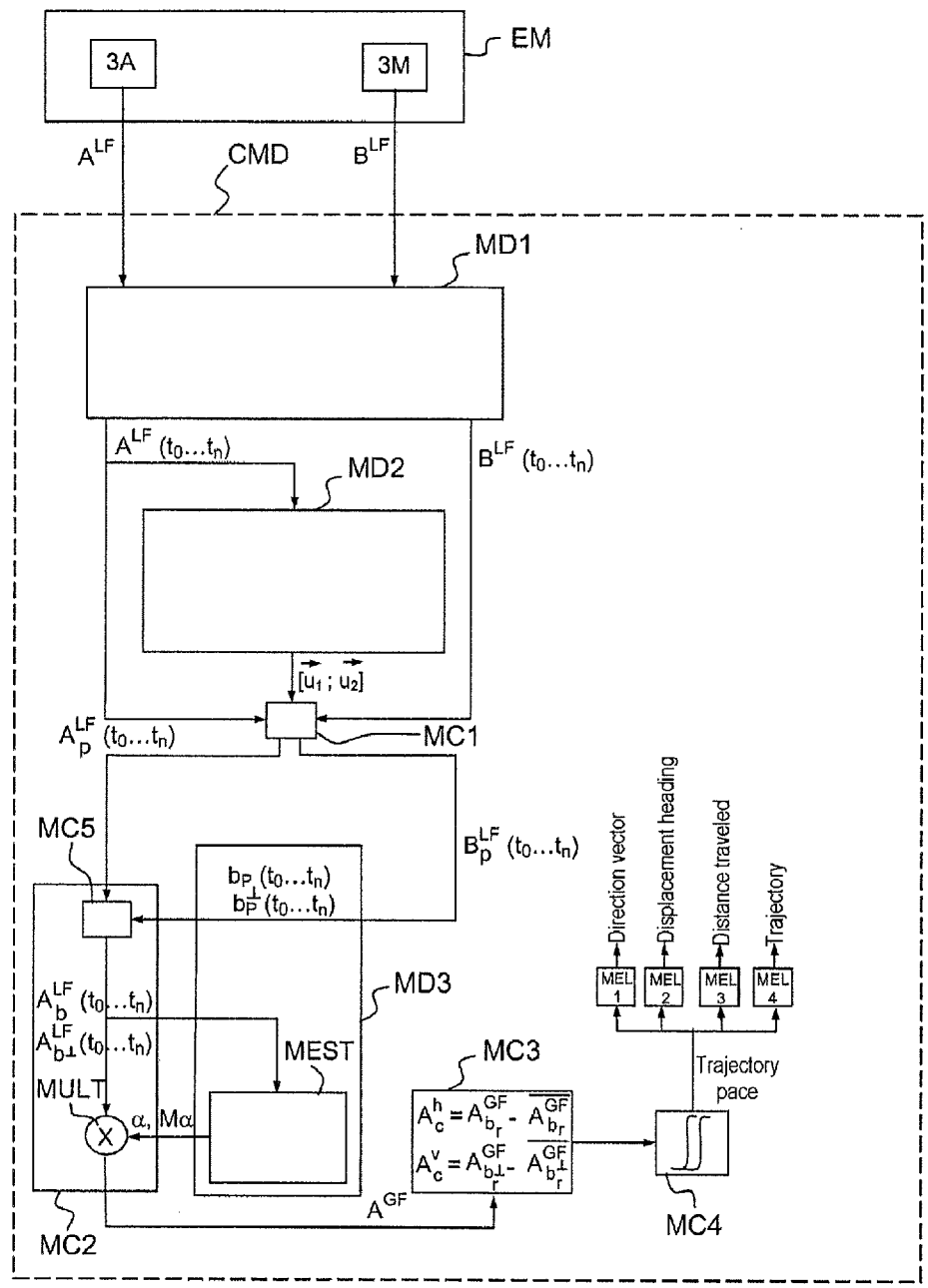
FIG. 1 schematically illustrates a mode of implementation of a device, according to one aspect of the invention.

As illustrated in FIG. 1, a control module CMD receives the measurements transmitted by a triaxial accelerometer 3A and an additional sensor for measuring a vector of a locally substantially constant vector field, in this instance a triaxial magnetometer 3M for measuring the terrestrial magnetic field. The triaxial accelerometer 3A is tied to a mobile element EM, and the magnetometer 3M is also tied to the same mobile element EM, directly or indirectly, and its measurement axes are substantially parallel to the measurement axes of the accelerometer. The mobile element EM may be, for example, in a non-limiting manner, a foot of a human body.

Of course, as a variant, if the magnetometer is fixed in the reference frame of the accelerometer, the reference frames of the two sensors are tied by a switching matrix, and it suffices to carry out a further transformation in order to express coordinates of a reference frame of one of the sensors in the reference frame of the other sensor, so as to use the coordinates of the measurements of the sensors in one and the same reference frame.

A first determination module MD1 makes it possible, on the basis of the measurements transmitted by the triaxial accelerometer 3A and the triaxial magnetometer 3M, to determine a first instant of immobility $t_0$ and a second instant of immobility $t_n$ of the triaxial accelerometer, subsequent to said first instant of immobility $t_0$. When the mobile element EM is a foot, an instant of immobility corresponds to a grounding of the foot on the contact surface. The technique used by the first determination module MD1 may, for example, be that described in the document "Robust step detection method for pedestrian navigation systems" (D. H. Hwang, J. H. Jang, and J. W. Kim) published in Electronics Letters, 43(14), in July 2007, in which the authors seek to detect a base shape, corresponding to a typical signal for a pace, in the signal of the norm of the accelerometers. When this shape is detected, the start corresponds to the instant $t_0$ and the end, to the instant $t_n$.

The successive instants $t_0, t_1, \ldots t_n$ are situated in time in a chronological manner between the first instant of immobility $t_0$ and the second instant of immobility $t_n$. The various successive instants $t_0, t_1, \ldots t_n$ correspond to a digitization and to a sampling of the signals arising from the sensors, followed by a calibration to get back to the measured physical quantities.

A second determination module MD2 makes it possible to determine the plane $[\vec{u}_1, \vec{u}_2]$ of said trajectory of the triaxial accelerometer 3A, on the basis of the vectors delivered by the triaxial accelerometer 3A, at the various successive instants $t_0, t_1, \ldots, t_n$, in a mobile reference frame LF tied to the triaxial accelerometer 3A and to the triaxial magnetometer 3M.

Figure 2:
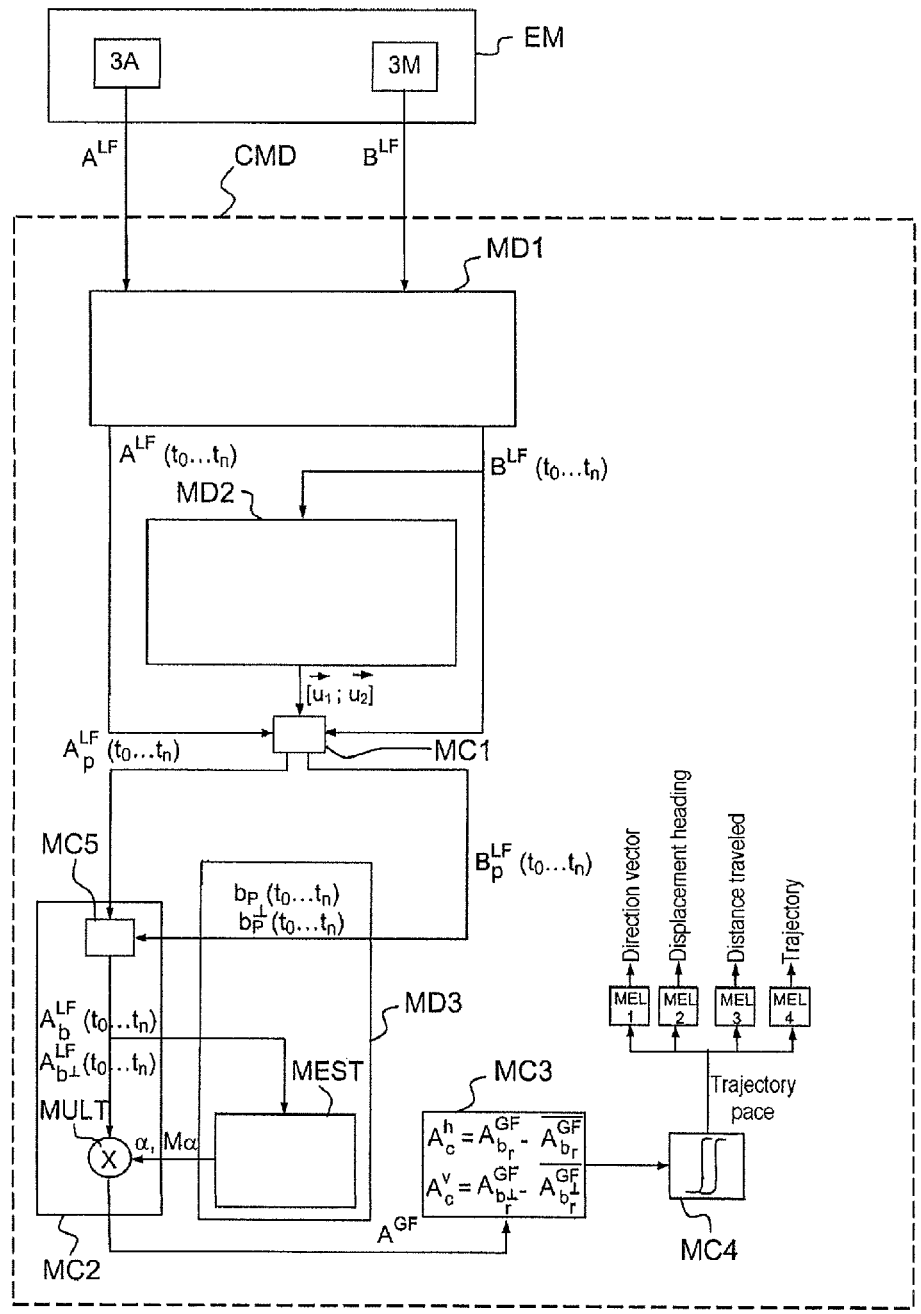
FIG. 2 schematically illustrates a mode of implementation of the control means of a device of FIG. 1, according to one aspect of the invention.

As a variant, as illustrated in FIG. 2, the second determination module MD2 can determine the plane $[\vec{u}_1, \vec{u}_2]$ of said trajectory on the basis of the vectors delivered by triaxial magnetometer 3M. The scheme used by this variant is analogous, on replacing the measurements of the triaxial accelerometer 3A by the measurements of the triaxial magnetometer 3M.

The plane $[\vec{u}_1, \vec{u}_2]$ corresponds to the plane containing at the maximum the measurements, considered to be points or vectors in a three-dimensional space by considering the measurements transmitted for each axis of the triaxial accelerometer 3A, or respectively of the triaxial magnetometer, and the axis defined by the vector $\vec{u}_3$ is the axis on which the projection of the measurements varies the least. The vector $\vec{u}_3$ is the vector normal to the plane of the trajectory $[\vec{u}_1, \vec{u}_2]$, but also the axis of rotation of the triaxial accelerometer 3A.

To determine these three vectors $\vec{u}_1, \vec{u}_2, \vec{u}_3$, the second determination means form a matrix $A^{LF}$ with n+1 rows, n+1 being the number of samples taken between $t_0$ and $t_n$ inclusive, and with 3 columns corresponding to the three measurements of the three axes x, y, z of the triaxial accelerometer 3A. We have:

$$A^{LF}(t_0, \ldots, t_n) = \begin{bmatrix} A_x^{LF}(t_0) & A_y^{LF}(t_0) & A_z^{LF}(t_0) \\ \ldots & \ldots & \ldots \\ A_x^{LF}(t_n) & A_y^{LF}(t_n) & A_z^{LF}(t_n) \end{bmatrix}$$

As a variant, it is possible to take just a subset of the samples at the successive instants $t_0, t_1, \ldots t_n$.

Several modes of implementation are possible for determining the three vectors $\vec{u}_1, \vec{u}_2, \vec{u}_3$, on the basis of the matrix $A^{LF}(=A^{LF}(t_0, \ldots, t_n))$.

One mode of implementation consists in performing the singular-value decomposition SVD of the matrix $A^{LF}$: $A^{LF}=USV$. V is a matrix with three rows and three columns, each column of which corresponds to one of the three vectors $\vec{u}_1, \vec{u}_2, \vec{u}_3$. The matrix S contains the three singular values $s_1, s_2, s_3$. These three singular values $s_1, s_2, s_3$, must be ranked in decreasing order. The vector $\vec{u}_3$ is the column of the matrix V corresponding to the smallest singular value. The other two columns give the coordinates of the vectors forming the plane $[\vec{u}_1, \vec{u}_2]$.

Another mode of implementation consists in decomposing the correlation matrix $R=A^{LFT}A^{LF}$ into three eigenvectors and eigenvalues ($R=u^T S u$) and in ranking them by decreasing eigenvalues $s_1, s_2, s_3$ so as to obtain the three vectors $\vec{u}_1, \vec{u}_2, \vec{u}_3$. $A^{LFT}$ corresponds to the matrix transpose of $A^{LF}$. The two eigenvectors corresponding to the larger two eigenvalues correspond to the plane $[\vec{u}_1, \vec{u}_2]$, the eigenvector $\vec{u}_3$ is that corresponding to the smallest eigenvalue.

The control module CMD also comprises a first calculation module MC1 for calculating, at the successive instants $t_0, t_1, \ldots t_n$, orthogonal projections of the vector delivered by the triaxial accelerometer 3A and of the vector delivered by the triaxial magnetometer 3M in said mobile reference frame LF, on the plane of the trajectory $[\vec{u}_1, \vec{u}_2]$ of the triaxial accelerometer 3A; the matrices of the projections are obtained:

$$A_p^{LF}(t_0 \ldots t_n) = [A(t_0 \ldots t_n) \cdot u_1, A(t_0 \ldots t_n) \cdot u_2]$$

$$B_p^{LF}(t_0 \ldots t_n) = [B(t_0 \ldots t_n) \cdot u_1, A(t_0 \ldots t_n) \cdot u_2]$$

The control module CMD comprises, furthermore, a third module MD3 for determining, at the successive instants $t_0, t_1, \ldots t_n$, the rotation for switching from the mobile reference frame LF to a fixed global reference frame GF, tied to the terrestrial reference frame, on the basis of the orthogonal projections of the vectors delivered by the triaxial magnetometer 3M. The third determination module MD3 advantageously determines an intermediate plane IF formed by the vectors $b_p(t)$, and $b_p^\perp(t)$, $b_p(t)$ being the unit vector of the terrestrial magnetic field $B^{LF}(t)$ and $b_p^\perp(t)$ being obtained by rotating the vector $b_p(t)$ by 90° in the plane of the trajectory or of the gait $[\vec{u}_1, \vec{u}_2]$.

Thus, the third determination module computes the vectors of the intermediate reference frame IF:

$$b_p(t) = B_p^{LF}(t)/\|B_p^{LF}(t)\| \text{ and } b_{p\perp}(t) = M_{90}b_p(t) = \begin{bmatrix} 0 & -1 \\ 1 & 0 \end{bmatrix} \cdot b_p(t)$$

A second calculation module MC2, of the control module CMD, performs the calculation, at the successive instants $t_0, t_1, \ldots, t_n$, of the orthogonal projection, provided by the first calculation module MC1, in the fixed global reference frame GF, of the vector delivered by the triaxial accelerometer 3A.

The second calculation module MC2 comprises a fifth calculation module MC5 for calculating switching in the intermediate reference frame IF, tied to the terrestrial reference frame:

Stated otherwise, $A_p^{LF}(t_0 \ldots t_n)$ is projected orthogonally in the plane of the trajectory $[\vec{u}_1, \vec{u}_2]$ onto the vectors $b_p(t)$, and $b_p^\perp(t)$ of the intermediate reference frame IF to obtain the accelerometer measurements projected onto the plane of the trajectory $[\vec{u}_1, \vec{u}_2]$ and expressed in the intermediate reference frame IF:

$$A^{IF}(t) = [A_p^{LF}(t) \cdot b(t), A_p^{LF}(t) \cdot b_\perp(t)] = [A_b^{IF}, A_{b_\perp}^{IF}]$$

The third module MD3 for determining the rotation for switching from the mobile reference frame LF to the fixed global reference frame GF comprises a module MEST for estimating an angle α, said switching rotation being defined by an orthogonal projection onto the substantially constant terrestrial magnetic field between the two instants of immobility $t_0$ and $t_n$, followed by a rotation by the estimated angle α in the plane $[\vec{u}_1, \vec{u}_2]$ of trajectory of the triaxial accelerometer 3A.

Stated otherwise, the estimation module MEST makes it possible to find the rotation α (characterized by a rotation matrix $M_\alpha$) to be performed in order to switch from the intermediate reference frame IF $\{b_p(t), b_p^\perp(t)\}$ to the global reference frame GF in the walking plane defined by the vectors $[\vec{h}, \vec{v}]$, the third vector of the global reference frame GF being $\vec{u}_3$.

In the case of pedestrian navigation, $\vec{h}$ is the horizontal in the walking plane and $\vec{v}$ the vertical.

To determine α, several modes of implementation of the estimation module MEST are possible.

A first mode of implementation can consist, knowing the slope θ between the two grounding points of the foot at the instants $t_0$ and $t_n$ with respect to the horizontal, in estimating α through the following equation:

$$\tan\alpha = \frac{\int_{t=t_0}^{t_n}\int_{\tau=t_0}^{t} A_{b\perp}^{IF}(\tau)d\tau dt - \tan\theta \int_{t=t_0}^{t_n}\int_{\tau=t_0}^{t} A_b^{IF}(\tau)d\tau dt}{\int_{t=t_0}^{t_n}\int_{\tau=t_0}^{t} A_b^{IF}(\tau)d\tau dt + \tan\theta \int_{t=t_0}^{t_n}\int_{\tau=t_0}^{t} A_{b\perp}^{IF}(\tau)d\tau dt}$$

This slope θ may be estimated by virtue of the inclination of the sensors on the foot when it is grounded, at $t_0$ or $t_n$, by considering that the slope is constant for the duration of the pace, or with the aid of a stored mapping delivering as output the slope of the contact surface of the place where the person (the mobile element EM) is situated.

In another mode of implementation, by admitting that the largest variance of the acceleration is applied along the displacement of the foot, the singular-value decomposition or SVD of the acceleration matrix $A^{IF}$ determines the matrix $M_\alpha$, the singular vector corresponding to the largest singular value corresponds to the vector $\vec{h}$.

$$A^{IF}\begin{bmatrix} A_b^{IF}(t_0) & A_b^{LF}(t_0) \\ \ldots & \ldots \\ A_b^{LF}(t_n) & A_b^{LF}(t_n) \end{bmatrix}$$

The singular-value decomposition may be written: $A^{IF} = USV$ where V is the matrix $M_\alpha$.

This assumption is valid only in the case of large paces for which the horizontal displacement is larger than the vertical displacement on flat ground, of zero slope. If the slope is not zero, it is possible to use this scheme but $\vec{h}$ will not be the horizontal but the vector joining the position of the sensor at the first instant of immobility $t_0$ to its position at the second instant of immobility $t_n$.

Another mode of implementation can also be envisaged, starting from the fact that at the instants $t_0$ and $t_n$ the foot is resting, the vertical is along the acceleration measured at this instant by the triaxial accelerometer 3A and α is the angle between $\vec{A}_p^{LF}(t_0)$ and $\vec{B}p^{LF}(t_0)$, or between $\vec{A}_p^{LF}(t_n)$ and $\vec{B}_p^{LF}(t_n)$.

The second calculation module MC2 also comprises a multiplier for protecting the measurements $A_p$ into the global reference frame:

$$\vec{A}^{GF}(t) = \lfloor A_h^{GF}(t) \; A_v^{GF}(t) \rfloor$$
$$= [A_b^{IF}(t) \; A_{b\perp}^{IF}(t)] M_{\alpha(t)}$$
$$= [A^{LF}(t) \cdot b(t) \; A^{LF}(t) \cdot b_\perp(t)] M_{\alpha(t)}$$

$$\text{and } M_\alpha = \begin{bmatrix} \cos(\alpha) & \sin(\alpha) \\ -\sin(\alpha) & \cos(\alpha) \end{bmatrix}$$

The control module CMD comprises, furthermore, a third calculation module MC3 for subtracting from the vector delivered by said second calculation means MC2 at said successive instants $t_0, t_1, \ldots t_n$, the mean vector over said successive instants, so as to obtain the accelerations centered in the plane $[\vec{u}_1, \vec{u}_2]$ of the trajectory of the triaxial accelerometer 3A, devoid of the influence of terrestrial gravity and of drifts of the device, in the fixed global reference frame GF. The third calculation module carries out the following calculations of contractions of the horizontal and vertical averages:

$$\vec{A}_c^{GF}(t) =$$
$$\left[ A_h^{GF}(t) - \frac{1}{t_n - t_0}\int_{\tau=t_0}^{t_n} A_h^{GF}(\tau)d\tau \quad A_v^{GF}(t) - \frac{1}{t_n - t_0}\int_{\tau=t_0}^{t_n} A_v^{GF}(\tau)d\tau \right]$$

The control module CMD also comprises a fourth module MC4 for calculating a characteristic of the trajectory of the triaxial accelerometer of the 3A on the basis of centered accelerations, for example by double temporal integration of the centered accelerations delivered by the third calculation module MC3, so as to obtain, in this instance, the trajectory, expressed in the fixed global reference frame GF, of the triaxial accelerometer 3A, that is to say of the foot of the user, in the plane of the trajectory of the foot during a pace, between the first grounding and the second grounding, or instants of immobility, $t_0$ and $t_n$.

The fourth calculation module MC4 makes it possible to integrate the acceleration twice with respect to time, so as to calculate the trajectory of the foot, or more precisely of the accelerometer tied to the foot, in the plane of the trajectory or of walking. The numerical integration may be carried out by employing the following relations, using integration by the method of rectangles:

$$\begin{cases} \vec{v}(t) = \vec{v}(t-1) + \vec{A}_c^{GF}/Fe \\ \vec{x}(t) = [x_h \; x_v] = \vec{x}(t-1) + \vec{v}(t)/Fe + \vec{A}_c^{GF}/(2Fe^2) \end{cases}$$

in which $\vec{v}(t_0) = [0 \; 0]$ and $\vec{x}(t_0) = [0 \; 0]$

In which Fe is the sampling frequency expressed in Hz, and the components of the matrix $\vec{A}_c^{GF}$ are expressed in m/s². $\vec{v}$ and $\vec{x}$ are respectively the velocity and position vectors along the two axes of the global reference frame {h,v}.

As a variant, the fourth calculation module MC4 can employ double integration by more complex modes of numerical calculation, for examples by using Splines.

As a variant, the fourth calculation module MC4 can perform single integration to get back to the velocity.

The control module CMD can comprise a first module MEL1 for computing a direction vector, adapted for linking the respective positions, expressed in said fixed global reference frame GF, of the triaxial accelerometer 3A with the first instant of immobility $t_0$ and with the second instant of immobility $t_n$.

The control module CMD can also comprise a second module MEL2 for computing a displacement heading with respect to said vector field measured by the additional sensor, in this instance with respect to the terrestrial magnetic field measured by the triaxial magnetometer 3M. The second computation module MEL2 can compute the heading in the following manner.

The heading of the displacement is defined as the angle between the terrestrial magnetic North pole and the direction of the displacement. It must not be confused with the heading of the person, which is his orientation with respect to North. It is often the latter which is estimated in the literature. The heading of the person is often assumed to be the same as that of the displacement. Now, this is the case only in the case of walking forward but not when walking backward, sideways, or slightly askew. Hence, the second computation module MEL2 estimates the heading of the displacement and more generally the trajectory in the NED (North,East,Down) reference frame as follows.

In the foregoing, the trajectory is estimated in a plane $\lfloor \vec{h}, \vec{v} \rfloor$ corresponding to the plane of the trajectory of the foot. The third vector $\vec{u}_3$, which makes it possible to form a reference frame $\{\vec{h},\vec{v},\vec{u}_3\}$ with three dimensions corresponding respectively to the horizontal in the plane of walking, to the vertical in the plane of walking and to a vector normal to the plane of walking, which is also assumed horizontal.

To calculate the heading, the following calculation is performed:

$$B^{GF}=B_h+B_v+B_{u3}$$

in which:

$B_h=\|B^{LF}\|[\cos \alpha\ 0\ 0]$ is the projection of the measurements of the triaxial magnetometer 3M $B^{GF}$ onto $h=\{1,0,0\}$;

$B_v=\|B^{LF}\|[\sin \alpha\ 0]$ is the projection of the measurements of the triaxial magnetometer 3M $B^{GF}$ onto $v=\{0,1,0\}$; and $B_{u3}=B^{GF}\cdot u_3^{GF}=B^{LF}(t)\cdot u_3^{LF}$ is the projection of the measurements of the triaxial magnetometer 3M $B^{GF}$ onto $u_3^{GF}=\{0,0,1\}$ and $u_3^F$ is the vector orthogonal to the plane of walking, expressed in the reference frame of the sensors and calculated previously.

The component $B_{u3}$ must be substantially invariant as a function of time, thus amounting to making the assumption of walking in a plane and more generally of a rotation about a substantially invariant axis and that the terrestrial magnetic field B is not disturbed. As this is generally not the case in practice, the second computation module can take the temporal average over the pace (between the instants of immobility $t_0$ and $t_n$) as estimation of this component.

To determine the heading $B_h$ and $B_{u3}$ alone are useful. Indeterminacies in the sign of the vectors $\vec{h}$ and $\vec{u}_3$ still remain. Indeed, such as they were defined hereinabove, $\vec{h}$ may be in the opposite direction to the direction of the displacement and $\vec{v}$ may be directed upward or downward.

The second computation module MEL2 constructs a reference frame $\{\vec{p}_1,\vec{p}_2,\vec{p}_3\}$ such that:

$\vec{p}_1$ is a horizontal vector in the plane of walking (parallel to $\vec{h}$) and in the direction of the displacement of the sensors;

$\vec{p}_2$ is a vertical vector (parallel to $\vec{v}$) directed downward;

$\vec{p}_3$ is a vector perpendicular to the plane of walking (parallel to $\vec{u}_3$) forming a right-handed reference frame $\{\vec{p}_1,\vec{p}_2,\vec{p}_3\}$.

The vectors $\vec{p}_1,\vec{p}_2,\vec{p}_3$ are determined as follows;

$\vec{p}_1$ is a horizontal vector which corresponds to the direction of the displacement of the user of the device. It is obtained by virtue of the horizontal displacement $x_h(t)$ which corresponds to the first component of the displacement vector $\vec{x}(t)$ given by the fourth calculation module MC4. If $x_h(t)$ is positive, then $\vec{p}_1=h=\{1\ 0\ 0\}$, otherwise $\vec{p}_1=-h=\{-1\ 0\ 0\}$, the displacement having to be positive in the direction of the displacement.

$\vec{p}_2$ is vertical and oriented downward. If the projection of B(t) on $\vec{v}$ is positive then $\vec{p}_2=v=\{0\ 1\ 0\}$, otherwise $\vec{p}_2=-v=\{0\ -1\ 0\}$, the terrestrial magnetic field B measured having always to be oriented downward.

$\vec{p}_3$ is the third vector forming a right-handed reference frame $\{\vec{p}_1,\vec{p}_2,\vec{p}_3\}$ with the other two.

The angle $\phi$ between the direction of the displacement $\vec{p}_1$ and magnetic North in the {North, East} reference frame may be obtained by inverting the following formulae:

$$\cos\hat\varphi = \frac{B^{GF}\cdot\vec{p}_1}{\sqrt{\left(B^{GF}\cdot\vec{p}_1\right)^2+\left(B^{GF}\cdot\vec{p}_3\right)^2}}$$

$$\sin\hat\varphi = \frac{B^{GF}\cdot\vec{p}_3}{\sqrt{\left(B^{GF}\cdot\vec{p}_1\right)^2+\left(B^{GF}\cdot\vec{p}_3\right)^2}}$$

The control module CMD can also comprise a third module MEL3 for computing the distance traveled between the first and second instants of immobility $t_0$ and $t_n$, i.e. a pace, and/or during a set of successive time intervals separating two successive instants of immobility $t_0$ and $t_n$ of the triaxial accelerometer, i.e. a succession of paces, on the basis of the data provided by the fourth calculation module.

For example the horizontal distance traveled during a pace is given by:

$$d_h(t_0,t_n)=x_h(t_n)-x_h(t_0)$$

for a series of paces, the distance traveled is given by the sum of the distances calculated for each pace.

The control module CMD can also comprise a fourth module MEL4 for computing a trajectory during a set of successive time intervals separating two successive instants of immobility $t_0$ and $t_n$ of the triaxial accelerometer 3A, in this instance during a set of successive paces, on the basis of the data provided by the fourth calculation module. For example, by means of the same formulae as those used by the second computation module MEL2, or directly on the basis of the results of the second computation module MEL2 if the device comprises them. The displacement in the corresponding horizontal plane is given by $x_h(t)$.

The displacement along the axis directed toward North is given by the following relation:

$$x_N(t) = x_h(t) \frac{B^{GF} \cdot \vec{p}_1}{\sqrt{\left(B^{GF} \cdot \vec{p}_1\right)^2 + \left(B^{GF} \cdot \vec{p}_3\right)^2}}$$

The displacement along the axis directed toward East is given by the following relation:

$$x_E(t) = x_h(t) \frac{B^{GF} \cdot \vec{p}_3}{\sqrt{\left(B^{GF} \cdot \vec{p}_1\right)^2 + \left(B^{GF} \cdot \vec{p}_3\right)^2}}$$

The down displacement is given by the following relation:

$x_D(t) = \pm x_v(t)$, the sign being given the sign of $\vec{p}_2$ which is oriented downward.

The estimated trajectory in the horizontal plane ($x_N(t)$, $x_E(t)$) for a series of paces is thus obtained.

It is also possible to estimate the displacement in any global reference frame GF for which the rotation matrix making it possible to switch from the NED reference frame to the desired reference frame is known. For example, when a person is in front of his games console. It is possible for an acquisition of the measurements to be effected when the person is stationary and facing his screen. The heading of the person which is calculated serves as reference for the orientation of his virtual depiction.

As a variant, the consideration of the two successive instants of immobility may be replaced with the consideration of two successive instants for which the velocity vectors in the plane of the trajectory are known, as well as of the angle α at these two instants, it being possible for these data to be measured by additional sensors or estimated on the basis of measurements provided by additional sensors. In such a case, the fourth calculation module must initialize the velocity with the velocity of the first instant and add a constant dependent on the velocities of the two instants to the centered acceleration.

In the more general case of a rotation about a substantially invariant axis, the second determination module MD2 estimates the axis of rotation by using the triaxial additional sensor, the first calculation module MC1 also performs a projection along the vector $u_3$. Furthermore, the third calculation module MC3 calculates the centered acceleration along the vector $u_3$, and the fourth calculation module MC4 integrates the latter centered acceleration, once to obtain the velocity, or twice for the position.

The present invention makes it possible, at reduced cost, to determine a planar trajectory of a triaxial accelerometer tied to a mobile element, notably a foot, in an accurate manner and at reduced cost. The mobile element may be another part of the human body, such as a hand, a part of an animal body, or a part of an artificial body such as a robot or a computer mouse.

The invention claimed is:

1. A device for determining a characteristic of a trajectory of a mobile element, the device comprising:
   a triaxial accelerometer attached to the mobile element;
   an additional triaxial sensor for measuring a vector of a relatively constant vector field in a fixed global reference frame with respect to the terrestrial reference frame, said additional triaxial sensor being attached to said mobile element and fixed in a reference frame of the triaxial accelerometer; and
   a control circuit, said control circuit comprising:
      first determining means for determining a first instant of immobility and a second instant of immobility of the triaxial accelerometer, the second instant of immobility being subsequent to said first instant of immobility;
      second determining means for determining a relatively invariant axis of rotation of the triaxial accelerometer between said first and second instants of immobility as the device moves between said first and second instants of immobility, and a plane orthogonal to said relatively invariant axis of rotation, in a mobile reference frame with respect to the accelerometer or to the additional triaxial sensor on the basis of vectors provided by the triaxial accelerometer, or on the basis of vectors provided by the additional triaxial sensor;
      first calculating means for calculating at successive instants between said first and second instants of immobility first orthogonal projections onto said plane of the vectors provided by the triaxial accelerometer and of the vectors provided by the additional triaxial sensor in said mobile reference frame;
      third determining means for determining at said successive instants a rotation for switching from said mobile reference frame to said fixed global reference frame, on the basis of said first orthogonal projections of the vectors delivered by the additional triaxial sensor;
      second calculating means for calculating at said successive instants second orthogonal projections in said fixed global reference frame of the first orthogonal projections, provided by said first calculating means in said plane of the vectors delivered by the triaxial accelerometer
      third calculating means for subtracting from each second orthogonal projection in said fixed global reference frame provided by the second calculating means a mean vector over said successive instants, so as to obtain accelerations centered in said plane relatively devoid of terrestrial gravitational influences and of drifts of said device, in said fixed global reference frame; and
      fourth calculating means for calculating a characteristic of the trajectory utilizing the centered accelerations obtained from the third calculating means.

2. The device as claimed in claim 1, wherein said successive positions are relatively coplanar.

3. The device as claimed in claim 1, wherein said mobile element is a foot, the time interval separating said first and second instants of immobility of the triaxial accelerometer corresponding to a pace of said foot.

4. The device as claimed in claim 1, wherein said control circuit comprises first computing means for computing a direction vector, configured to link the respective positions, expressed in said fixed global reference frame, of the triaxial accelerometer to said first instant of immobility and to said second instant of immobility.

5. The device as claimed in claim 4, wherein said plane of the trajectory is vertical, and said control circuit further comprises second computing means for computing a displacement heading with respect to said vector field measured by the additional triaxial sensor, said second computing means configured to determine an orthogonal projection, of said vector field vector measured by the additional triaxial sensor, onto a horizontal plane orthogonal to said plane of the trajectory.

6. The device as claimed in claim 1, wherein said plane of the trajectory is vertical, and said second determining means is configured to determine a singular-value decomposition of a three-column matrix formed by vectors provided by the triaxial accelerometer at said successive instants, in said mobile reference frame, and extracting two vectors corresponding to two larger singular values.

7. The device as claimed in claim 1, wherein said plane of the trajectory is vertical, and said second determining means is configured to perform a decomposition into eigenvalues and eigenvectors, in said mobile reference frame, an autocorrelation matrix of a three-column matrix formed by vectors provided by the triaxial accelerometer at said successive instants, and extracting two eigenvectors corresponding to two larger eigenvalues.

8. The device as claimed in claim 1, wherein said second calculating means comprises fifth calculating means for switching to an intermediate reference frame with respect to the terrestrial reference frame, defined by a first vector delivered by said first calculation means on the basis of a vector provided by the additional triaxial sensor, and by a second vector, orthogonal to said first vector and within said plane of the trajectory.

9. The device as claimed in claim 8, wherein said third determining means comprises estimating means for estimating an angle, wherein said switching rotation is determined by an orthogonal projection onto said relatively constant vector field, followed by a rotation by said angle in said plane of trajectory of the triaxial accelerometer.

10. The device as claimed in claim 9, wherein said estimation means is configured to estimate said angle utilizing a slope of a contact surface of the mobile element, and of the vector transmitted by said fifth calculating means on the basis of a vector transmitted by the triaxial accelerometer.

11. The device as claimed in claim 9, wherein said estimation means is configured to estimate said angle utilizing a singular-value decomposition of a three-column matrix provided by said fifth calculation means on the basis of a matrix formed by vectors delivered by the triaxial accelerometer at said successive instants.

12. The device as claimed in claim 9, wherein said estimation means is configured to estimate said angle as an angle, at said first or second instant of immobility, between a vector delivered by said first calculating means on the basis of a vector provided by the additional triaxial sensor, and a vector delivered by said first calculating means on the basis of a vector provided by the triaxial accelerometer.

13. The device as claimed in claim 1, wherein said control circuit comprises third computing means for computing a distance traveled between said first and second instants of immobility, or during a set of successive time intervals separating two successive instants of immobility of the triaxial accelerometer, utilizing data provided by said fourth calculating means.

14. The device as claimed in claim 1, wherein said control circuit comprises fourth computing means for computing a trajectory during a set of successive time intervals separating two successive instants of immobility of the triaxial accelerometer, utilizing data provided by said fourth calculating means.

15. The device as claimed in claim 1, wherein said additional triaxial sensor is a triaxial magnetometer for measuring the terrestrial magnetic field, which is relatively constant between said first and second instants of immobility.

16. The device as claimed in claim 1, wherein said triaxial accelerometer is disposed so as to be positioned relatively at a level of a contact surface of the mobile element at an instant of immobility of said triaxial accelerometer.

17. The device as claimed in claim 1, wherein said additional triaxial sensor is disposed so as to be positioned at a predetermined distance from a contact surface of said mobile element, at an instant of immobility of said triaxial accelerometer.

18. The device as claimed in claim 1, wherein said control circuit is connected to the mobile element or disposed at a predetermined distance from the mobile element, and is adapted for operating in real or non-real time.

19. A video game system comprising a visual or auditory indicator for indicating at least one pace to be taken by the player, characterized in that the video game system comprises at least one device as claimed in claim 3.

20. A jump analysis system, characterized in that the jump analysis system comprises at least one device as claimed in claim 3.

21. An outdoor or indoor geolocation system, characterized in that the geolocation system comprises at least one device as claimed in claim 3.

22. A system for calculating energy expenditure of a user, characterized in that the system comprises at least one device as claimed in claim 3.

23. The device as claimed in claim 1, wherein said characteristic of the trajectory of the triaxial accelerometer comprises a velocity of the triaxial accelerometer.

24. The device as claimed in claim 1, wherein said characteristic of the trajectory of the triaxial accelerometer comprises a trajectory of the triaxial accelerometer.

25. A method for determining a characteristic of a trajectory obtained from successive positions of a triaxial accelerometer attached to a mobile element, between a first instant of immobility and a second instant of immobility of the triaxial accelerometer, the second instant of immobility being subsequent to said first instant of immobility, the method further comprising utilizing an additional triaxial sensor for measuring a vector of a relatively constant vector field in a fixed global reference frame with respect to the terrestrial reference frame, said additional triaxial sensor being connected to said mobile element and fixed in a reference frame of the triaxial accelerometer, said method further comprising, using a data processor, performing the following steps:

determining said first and second instants of immobility of the triaxial accelerometer;

determining, as the mobile element moves between said first and second instants of immobility, a relatively invariant axis of rotation of the triaxial accelerometer between the first and second instants of immobility, and determining a plane orthogonal to said relatively invariant axis of rotation, in a mobile reference frame with respect to the accelerometer or to the additional triaxial sensor, utilizing vectors provided by the triaxial accelerometer or utilizing vectors provided by the additional triaxial sensor;

calculating, at successive instants between said first and second instants of immobility, first orthogonal projections in said plane, of the vectors provided by the triaxial accelerometer and of the vectors provided by the additional triaxial sensor in said mobile reference frame;

determining, at said successive instants, a rotation for switching from said mobile reference frame to said fixed global reference frame, utilizing said first orthogonal projections of the vectors provided by the additional triaxial sensor;

calculating, at said successive instants, second orthogonal projections in said fixed global reference frame of the first orthogonal projections in said plane of the vectors provided by the triaxial accelerometer;

subtracting from each second orthogonal projection in said fixed global reference frame, a mean vector over said successive instants so as to obtain accelerations centered in said plane, relatively devoid of influence of terrestrial gravity and of drifts of said device, in said fixed global reference frame; and determining a characteristic of the trajectory on the basis of the centered accelerations.

* * * * *